United States Patent
Handelman

(10) Patent No.: US 11,501,302 B2
(45) Date of Patent: Nov. 15, 2022

(54) SYSTEMS AND METHODS FOR GENERATING A MACHINE LEARNING MODEL FOR RISK DETERMINATION

(71) Applicant: PAYPAL, INC., San Jose, CA (US)

(72) Inventor: Tomer Handelman, Ramat-Gan (IL)

(73) Assignee: PayPal, Inc., San Jose, CA (US)

( * ) Notice: Subject to any disclaimer, the term of this patent is extended or adjusted under 35 U.S.C. 154(b) by 79 days.

(21) Appl. No.: 16/849,343

(22) Filed: Apr. 15, 2020

(65) Prior Publication Data

US 2021/0326881 A1 Oct. 21, 2021

(51) Int. Cl.
| | | |
|---|---|---|
| G06Q 20/40 | (2012.01) | |
| G06Q 40/02 | (2012.01) | |
| G06F 40/30 | (2020.01) | |
| G06N 20/00 | (2019.01) | |
| G06N 7/00 | (2006.01) | |
| G06Q 10/10 | (2012.01) | |

(52) U.S. Cl.
CPC ......... *G06Q 20/4016* (2013.01); *G06F 40/30* (2020.01); *G06N 7/005* (2013.01); *G06N 20/00* (2019.01); *G06Q 10/10* (2013.01); *G06Q 40/025* (2013.01)

(58) Field of Classification Search
None
See application file for complete search history.

(56) References Cited

U.S. PATENT DOCUMENTS

| | | | |
|---|---|---|---|
| 8,234,274 B2* | 7/2012 | Guo | G06N 7/005 |
| | | | 707/726 |
| 9,519,858 B2* | 12/2016 | Zweig | G06F 40/44 |
| 9,799,035 B2* | 10/2017 | Cama | G06Q 30/01 |
| 10,198,431 B2* | 2/2019 | Somasundaran | G06F 40/284 |
| 10,242,019 B1* | 3/2019 | Shan | G06N 7/005 |
| 10,395,648 B1* | 8/2019 | Benkreira | G10L 15/063 |
| 10,579,938 B2* | 3/2020 | Zoldi | G06V 30/40 |
| 10,740,852 B1* | 8/2020 | George | G06Q 20/202 |
| 10,949,825 B1* | 3/2021 | Brosamer | G06Q 20/202 |

(Continued)

OTHER PUBLICATIONS

Stein et al., "An Analysis of Hierarchical Text Classification Using Word Embeddings",https://arxiv.org/abs/1809.01771 v1, Sep. 6, 2018, pp. 1-22. (Year: 2018).*

(Continued)

*Primary Examiner* — Mohammad Z Shaikh
(74) *Attorney, Agent, or Firm* — Haynes and Boone, LLP

(57) ABSTRACT

Methods and systems are presented for configuring a risk assessment engine to predict a risk of a user based on a topic classification across a set of unknown topics generated by a topic model. A risk determination system obtains a plurality of transactions previously conducted by a user. The risk determination system generates a risk document comprising a sequence of words that describe the plurality of transactions. A topic model is used to determine a topic classification for the user based on the sequence of words. The topic model comprises a natural language processor configured to classify the risk document to one or more topics based on the words within the risk document. The risk determination system configures the risk assessment engine to accept the topic classification as input value(s) for predicting a risk associated with the user.

20 Claims, 7 Drawing Sheets

(56) References Cited

U.S. PATENT DOCUMENTS

| | | | | |
|---|---|---|---|---|
| 10,957,433 | B2* | 3/2021 | Lucas | G06F 40/30 |
| 11,348,119 | B1* | 5/2022 | Brennan | G06Q 10/105 |
| 2005/0044039 | A1* | 2/2005 | Greer | G06Q 20/04 |
| | | | | 705/39 |
| 2010/0145678 | A1* | 6/2010 | Csomai | G06F 40/169 |
| | | | | 704/10 |
| 2013/0142418 | A1* | 6/2013 | van Zwol | G06K 9/00751 |
| | | | | 382/159 |
| 2014/0214835 | A1* | 7/2014 | Oehrle | G06F 16/35 |
| | | | | 707/737 |
| 2016/0048768 | A1* | 2/2016 | Liu | G06Q 30/0631 |
| | | | | 706/11 |
| 2016/0232155 | A1* | 8/2016 | Allen | G06Q 10/06316 |
| 2018/0025303 | A1* | 1/2018 | Janz | G16H 50/20 |
| | | | | 705/2 |
| 2018/0053188 | A1* | 2/2018 | Zoldi | G06Q 20/102 |
| 2018/0225379 | A1* | 8/2018 | Bhadury | G06F 7/026 |
| 2018/0268506 | A1* | 9/2018 | Wodetzki | G06V 30/413 |
| 2019/0065986 | A1* | 2/2019 | Witbrock | G06N 20/00 |
| 2019/0130014 | A1* | 5/2019 | Zhang | G06N 5/022 |
| 2019/0156196 | A1* | 5/2019 | Zoldi | G06Q 20/40 |
| 2019/0349393 | A1* | 11/2019 | Nunes | G06Q 10/0635 |
| 2020/0250269 | A1* | 8/2020 | Koseki | G06N 3/006 |
| 2020/0351225 | A1* | 11/2020 | Lenchner | G06N 3/0445 |
| 2021/0133286 | A1* | 5/2021 | Yang | G06F 40/284 |
| 2021/0150398 | A1* | 5/2021 | Bastide | G06N 3/084 |
| 2021/0201331 | A1* | 7/2021 | Handelman | G06F 40/40 |

OTHER PUBLICATIONS

Haribhakta, Y.V. et al, "Learning Context for Text Categorization", Department of Computer Engineering & IT College of Engineering, Pune, Maharashtra, India, https://arxiv.org/abs/1112.2031 v1, Dec. 9, 2011, pp. 1-.9 (Year: 2011).*

E. Egorov, F. Nikitin, V. Alekseev, A. Goncharov and K. Vorontsov, "Topic Modelling for Extracting Behavioral Patterns from Transactions Data," 2019 International Conference on Artificial Intelligence: Applications and Innovations (IC-AIAI), 2019, pp. 44-444 (Year: 2019).*

* cited by examiner

Amazon; Best_Buy; Whole_Foods; Panera_Bread; Indian_Cuisine; Gambling_Fun; Ralphs; Pizza_Outlet; Best_Buy; Indian_Cuisine; Best_Buy; Frys_Electronics; Express_Clothing; Gambling_Fun; Burger_Express.

SYSTEMS AND METHODS FOR GENERATING A MACHINE LEARNING MODEL FOR RISK DETERMINATION

BACKGROUND

The present specification generally relates to machine learning models, and more specifically, to configuring a machine learning model in risk analysis of electronic transactions according to various embodiments of the disclosure.

RELATED ART

Conducting electronic transactions (e.g., purchasing products, transferring content or funds, etc.) over the Internet offers tremendous benefits. At the same time, the Internet also provides opportunities for malicious users to conduct fraudulent transactions without being noticed. Due to its anonymous nature, it is often difficult for an online service provider to assess risks associated with users or pending electronic transactions based on the limited information available to the online service provider. The risk that is determined by the online service provider may be used by the online service provider to determine whether to approve or deny a transaction, and in some cases, determine to offer credit (and how much credit) to a user for the use in the transaction. Traditionally, determining the risk of a transaction depends on limited information that the online service provider has associated with the transaction and the user who initiated the transaction, and knowledge related to any correlations between the information acquired by the online service provider and risks. However, as transaction trends come and go, it is challenging to maintain up-to-date knowledge in order to provide accurate risk assessments for the transactions. Thus, there is a need for accurate assessments of risks associated with electronic transactions without relying on pre-existing knowledge.

Figure 1:
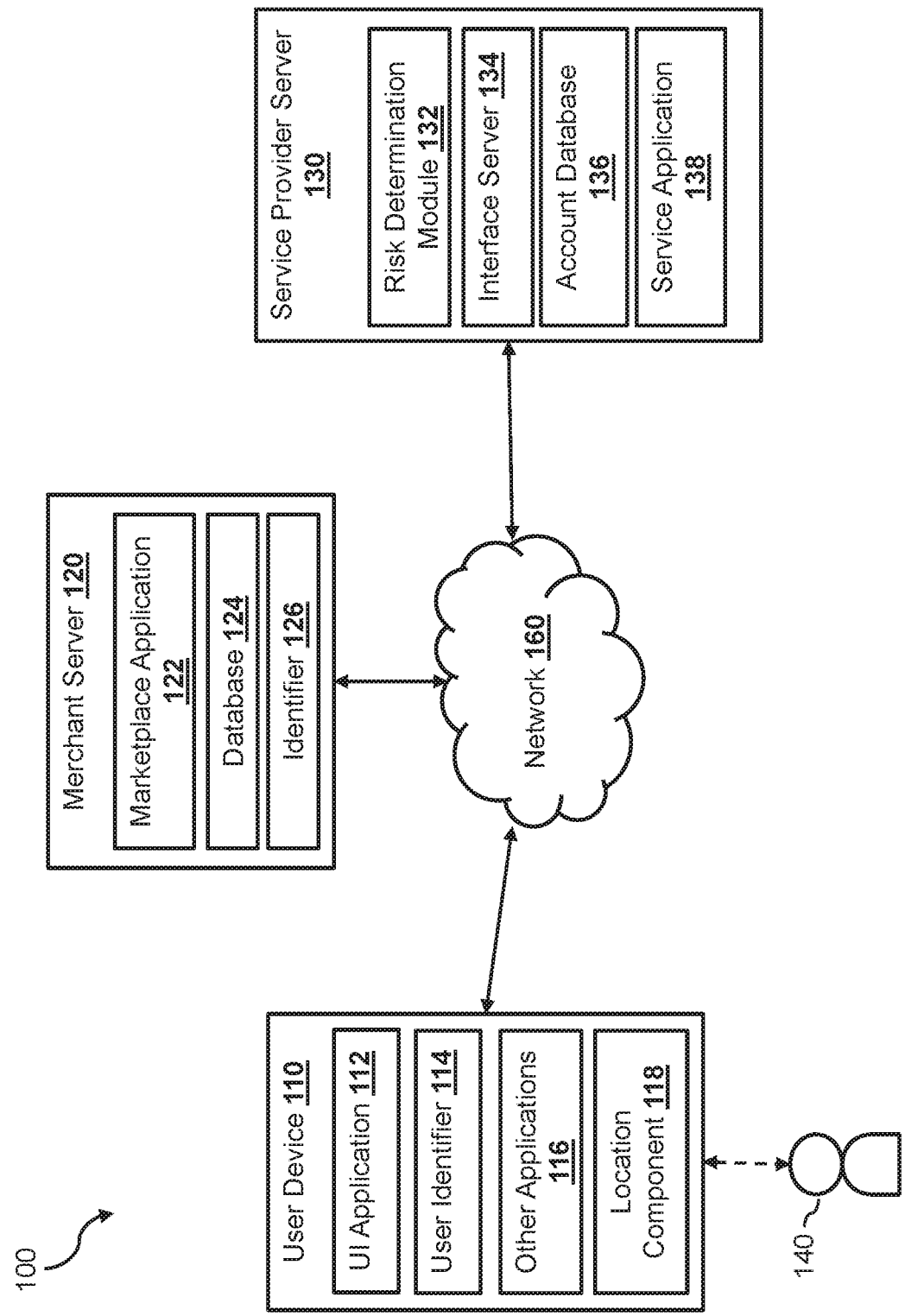
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for configuring a risk assessment engine to determine a risk associated with a user or an electronic transaction. The risk assessment engine may be a machine learning model (e.g., a regression model such as a k-nearest neighbors model, a classification model, etc.) that is configured to receive a set of input values and to produce an output that corresponds to a risk indicator (e.g., a risk category, a risk type, a risk score, etc.) based on the input values.

As discussed above, conventionally, risk assessment of a user or a transaction requires knowledge (e.g., domain knowledge) related to any correlations between the information acquired by the online service provider and risks. For example, when building a risk assessment engine, an online service provider may be required to identify what factors are relevant to the risk assessment and how these factors affect the risk associated with the user or the transaction. In an example where the online service provider performs electronic transactions for users, the online service provider may use data associated with previous transactions conducted by a user for assessing a risk of the user or a transaction initiated by the user. However, using the conventional methods, the online service provider may be required to determine how different data (e.g., different aspects) associated with previous transactions may affect the risk of the user or the transaction initiated by the user, in order to make use of the data in making the risk assessment. Often times, the aspect(s) are guesses made by human evaluators associated with the online service provider who have domain knowledge about the transactions and risks. In one particular example, the human evaluators may determine that previous payment transactions conducted by a user that are associated with one or more specific types of merchants (e.g., gambling-related merchants) may increase a risk associated with the user or transactions initiated by the user. The online service provider may proceed to build a risk assessment engine that accepts input value(s) related to the types of merchants (e.g., how many previous transactions conducted by a user are from gambling-related merchants) for assessing risks of users and/or transactions. When a new transaction request is received, the online service provider may classify the transaction request and associate it to one or more types of merchants (e.g., gambling-related merchants, clothing stores, grocery stores, etc.), and determine the risk for the user and/or the transaction request based at least in part on the classification of the transaction request.

However, as discussed herein, purchase trends may change over time (some very quickly), and aspect(s) that may be relevant in assessing risk some time ago may no longer be relevant in assessing risk now. Furthermore, aspect(s) that are not apparent to the human evaluators but are indeed relevant to assessing risk may be overlooked, and thus, excluded from the risk assessment engine. Thus, risk assessment engines that are configured based on human identified factors may not accurately evaluate risks over time.

Therefore, according to various embodiments of the disclosure, a risk determination system may configure a risk assessment engine to produce an output corresponding to a risk of a user or a transaction based on a topic classification generated by a topic model based on a set of unknown topics. In some embodiments, the topic model comprises a natural language processor configured to classify a text document and associate it to one or more topics based on the text within the text document. In some embodiments, the topic model may be a latent topic model, such that the topic model is configured to classify documents into unknown topic(s) without requiring the topic(s) to be defined (e.g., the topic(s) are not defined prior to training the topic model). For example, the latent topic model may be a latent semantic indexing model, a Latent Dirichlet Allocation (LDA) model, a Recurrent Neural Network (RNN), etc.

In some embodiments, the topic model may produce (e.g., output) a topic classification based on the text document. The topic classification may indicate one or more topic(s) derived from the text document or may include a probability distribution over multiple topic classifications. Since the topic model is configured to parse text document and generate a topic classification, the risk determination system may first generate a text document for a user and/or a transaction.

For example, in response to receiving a request for performing a transaction for a user, the risk determination system may first generate, for the user, a text document (e.g., a risk document). The text document may include texts that are associated with the user. In some embodiments, the risk determination system may generate the text document with texts (e.g., words) that describe the user and/or previous transactions associated with the user over a particular time frame (e.g., the past year, the past month, etc.). In one example, the risk determination system may include identities (e.g., names) of the other parties (e.g., merchants, sellers, vendors, etc.) in the previous transactions, amounts associated with the previous transactions, timestamps associated with the previous transactions, and possibly other word(s) that describe the previous transactions. The risk determination system may separate texts associated with each of the previous transactions using a delimiter such as a space, a semicolon, etc. In some embodiments, the risk determination system may insert the texts associated with the previous transactions into the text document in a chronological order (e.g., from old to new, etc.) based on the timestamps associated with the previous transactions. In some embodiments, the texts included in the text document are directly from the transaction data (e.g., actual data collected during the transaction process without including data inferred by the risk determination system or the online service provider, such as an industry type associated with the merchant, a risk score associated with the previous transaction, etc.).

Once the risk determination system generates the text document for the user and/or the transaction, the risk determination system may provide the text document as an input to the topic model. As discussed herein, the topic model is configured to analyze texts within a text document, and to output a topic classification based on the texts within the text document. To configure the topic model, the risk determination system may provide to the topic model a number corresponding to a desirable number of topics that the topic model can classify documents into (e.g., 5, 10, 20, 30, etc.) without defining the different topics (e.g., without providing rules and algorithms to the topic model in how to classify the text documents into the different topics) and a corpus of text documents. The topic model may assume that each of the documents is characterized by a particular set of topics (corresponding to the desirable number of topics), and that each text (e.g., each word) in the document contributes to at least one of the topics. By identifying and analyzing the texts (e.g., the words) in the documents of the corpus, the topic model may derive (e.g., learn) patterns and/or rules related to how different words may contribute to different topics. After the topic model is trained, the topic model may output a topic classification for a document based on parsing and analyzing the texts in the document. In one example, the topic classification includes a probability distribution across the different topics (e.g., a vector of probabilities associated with the different topics).

The topics that the topic model classifies a document into may not follow any pre-established rules and may not be comprehensible by a human. Using the example where the identities (e.g., names) of the merchants or sellers involved in the previous transactions are used to generate the text document, the topic model may classify the text document into topics that may correspond to types of merchants. However, the topics (e.g., the types of merchants) may not be ones that are recognizable by humans. It is because the topic model is trained to recognize patterns or topics that may not be apparent to humans but may nonetheless be critical in differentiating the transactions from one another.

Thus, the topic model of some embodiments may output a probability distribution across the different unknown topics. In some embodiments, the topic distribution may be represented by a vector of probabilities, where each probability in the vector corresponds to a probability that the document is associated with a particular topic among the different topics. For example, if the topic model is configured to classify documents into five different topics, the topic distribution may include a vector having five probabilities, such as [0.2, 0.1, 0.4, 0.3, 0.0]. The vector indicates that the document has a 20% chance of being associated with a first topic, a 10% chance of being associated with a second topic, a 40% chance of being associated with a third topic, a 30% chance of being associated with a fourth topic, and 0% chance of being associated with a fifth topic. It is noted that the topic classification output varies based on the parameter (e.g., the number of topics) used to configure the topic model. For example, when the topic model is configured to classify documents into 20 different topics, the topic classification output may include a vector of 20 probabilities. Thus, the topic model is configured to classify the user based on transactions conducted by the user over the particular time period.

However, the user's transaction habits change over time and the user's more recent transactions are more indicative to how the user behaves (e.g., risk of the user) than the user's older transactions. Thus, in some embodiments, the risk determination system may take into account the timing of different transactions associated with the user by generating multiple risk documents associated with different time periods. The time periods may be different in one or more aspects. For example, the risk determination system may generate different risk documents associated with different lengths of time—a first risk document that covers transactions over a first time period (e.g., the past year), a second risk document that covers transactions over a second time period (e.g., the past month), and a third risk document that covers transactions over a third time period (e.g., the past week). In another example, the risk determination system may generate different risk documents associated with different periods of time—a first risk document that covers transactions over a first time period (e.g., January to March), a second risk document that covers transactions over a second time period (e.g., April to June), and a third risk document that covers transactions over a third time period (e.g., July to September). The risk determination system may then use the topic model to produce a topic classification for each of the generated risk documents. In the example described above, the topic model may produce three different topic classifications for the three risk documents.

In some embodiments, the risk determination system may use the topic classification(s) (e.g., the vector of probabilities) to assess a risk of the user and/or the transaction. In some embodiments, the risk determination system may configure a machine learning model (e.g., a neural network) to accept the vector of probabilities as input values and to output a risk based on the vector of probabilities. The risk output may include a risk category (e.g., a high risk, a moderate risk, a low risk, etc.) or may include a risk score (e.g., a percentage, etc.). The risk determination system may train the machine learning model using training data that includes different topic classifications (e.g., different vectors of probabilities) that are labeled with corresponding risk. Thus, when the risk determination system obtains the topic classification(s) for the user and/or the transaction, the risk determination system may provide the topic classification(s) to the machines learning model, which in turn may output a risk that is associated with the user and/or the transaction.

In another embodiment, the risk determination system may configure a clustering-based model (e.g., a k-nearest neighbor model) to assess risks of users and/or transactions. For example, using historical topic classifications that the risk determination system obtains from the topic model, the risk determination system may define two or more clusters using a clustering algorithm (e.g., a k-means clustering algorithm), where each cluster is associated with a risk category (e.g., a particular risk score, a risk classification, etc.). The risk determination system may then determine a cluster that the topic classification is associated with based on Euclidean distances between the topic classification and other historical topic classification (e.g., the cluster with historical topic classifications having shortest Euclidean distances with the topic classification. The risk determination system may then assign the risk category associated with the cluster to the user and/or transaction.

The online service provider may then process the transaction initiated by the user based on the risk category determined by the risk determination system for the user. For example, the online service provider may authorize or deny the transaction based on the risk category determine for the user. In some embodiments, the online service provider may also determine whether to extend a credit to the user for the transaction (and how much credit) based on the risk category.

FIG. 1 illustrates an electronic transaction system 100, within which the risk determination system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120, a mobile application associated with the merchant server 120, or a point-of-sale (POS) system associated with the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) with the merchant server 120 and/or the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. For example, location information may be obtained by checking in using the user device 110 via a check-in device at a location or in an authentication process to determine if a request coming from the user device 110 is fraudulent or valid.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. Even though only one merchant server 120 is shown in FIG. 1, it has been contemplated that one or more merchant servers (each similar to merchant server 120) may be communicatively coupled with the service provider server 130 and the user device 110 via the network 160 in the system 100. As such, the service provider server 130 may facilitate payment transactions for users with different merchants associated with different merchant servers similar to the merchant server 120.

The service provider server 130, in one embodiment, may be maintained by a transaction processing entity or an online service provider, which may provide processing for electronic transactions between users (e.g., the user 140 of user device 110) and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the data server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a risk determination module 132 that implements the risk determination system as discussed herein. The risk determination module 132 is configured to assess a risk associated with a user or a transaction. For example, the service provider server 130 may receive a request to perform a transaction for a user (e.g., the user 140) from the user device 110. The service provider server 130 may use the risk determination module 132 to determine a risk associated with the user 140 and/or the transaction using the techniques described herein. For example, the risk determination module 132 may retrieve data associated with transactions previously conducted by the user 140 from the account database 136. The risk determination module 132 may generate a text document (e.g., a risk document) based on words associated with the transactions previously conducted by the user 140. In one example, the risk determination module 132 may extract identities (e.g., names) of the merchants in those transactions and may generate the risk document based on the identities of the merchants. For example, the risk determination module 132 may insert the merchant identities as words in the risk document in a chronological order, separated by a delimiter such as spaces. The risk determination module 132 may then use a topic model to classify the user based on the risk document. The classification of the user may then be used by the risk determination module to assess a risk associated with the user and/or the transaction. The service provider server 130 may then process the transaction request based on the risk.

Figure 2:
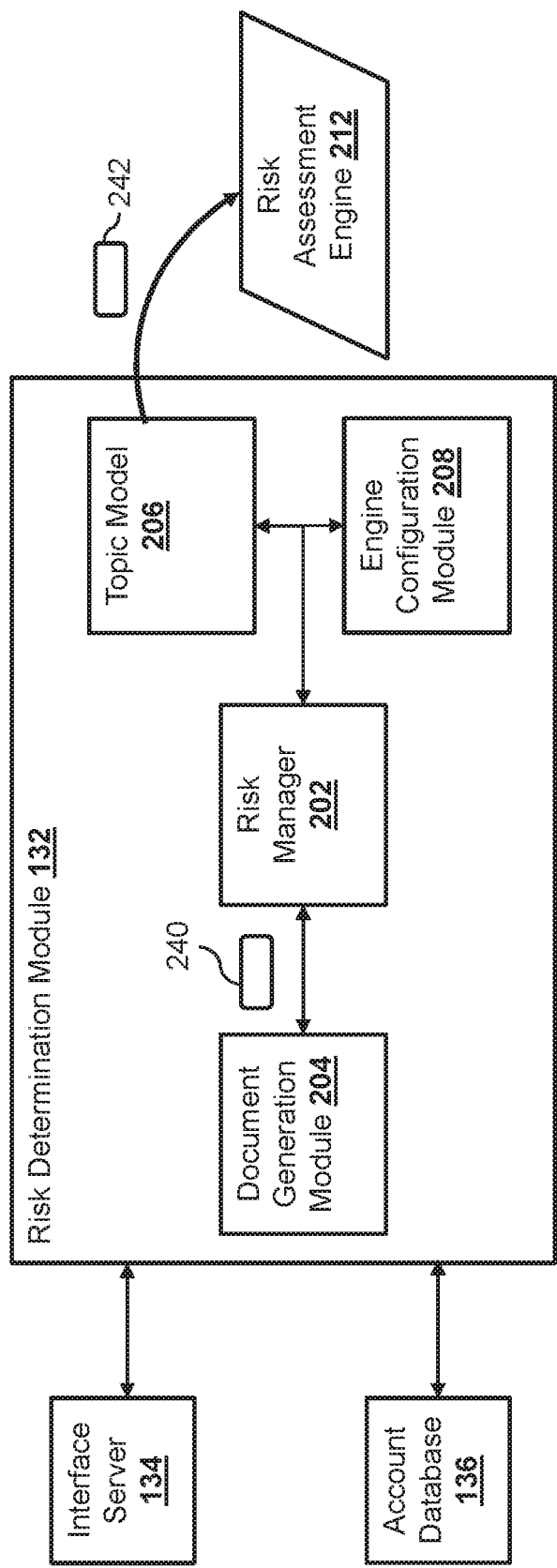
FIG. 2 is a block diagram illustrating a risk determination module according to an embodiment of the present disclosure.

FIG. 2 illustrates a block diagram of the risk determination module 132 according to an embodiment of the disclosure. The risk determination module 132 includes a risk determination manager 202, a document generation module 204, a topic model 206, and an engine configuration module 208. The user 140 may use the user device 110 to interact with the merchant server 120 and/or the service provider server 130. For example, the user 140 may use the UI application 112 on the user device 110 to interact with the marketplace application 122 of the merchant server 120 (e.g., a website of the merchant). The user 140 may initiate a payment transaction with the merchant associated with the merchant server 120 via the service provider server 130. The payment transaction may be associated with a purchase of goods or services offered by the merchant via the marketplace application 122. In some embodiments, the user 140 or the merchant may initiate the payment transaction by interacting with the interface server 134.

Prior to processing the transaction request, the interface server 134 may transmit, to the risk determination module 132, a request for assessing a risk associated with the user 140 and/or the transaction based on the transaction request. The request may include an identity of the user 140 and attributes associated with the transaction (e.g., an amount, an identity of the merchant, etc.). Upon receiving the request from the interface server 134, the risk manager 202 may retrieve data associated with the user 140 from the account database 136. In some embodiments, the risk manager 202 may retrieve data associated with transactions previously conducted by the user 140 over a period of time (e.g., the past year, the past month, the past three months, etc.) from the account database 136. The risk manager 202 may then use the document generation module 204 to generate a text document (e.g., a risk document) 240 for the user 140 based on the data associated with the previous transactions.

In some embodiments, the document generation module 204 may generate a text document 240 based on words associated with the previous transactions, such as identities (e.g., names, identifiers, etc.) of the merchants, geographical locations, produces or services purchased, etc. in the previous transactions. The document generation module 204 may insert the words in the text document 240 and may separate the words using a delimiter such as a space or a semicolon. In some embodiments, the document generation module 204 may arrange the words associated with the transaction in an order, such as a chronological order (from old to new) in the risk document 240.

Figure 3:
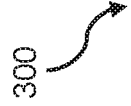
FIG. 3 illustrates an exemplary risk document according to an embodiment of the present disclosure.

FIG. 3 illustrates an example text document 300 generated by the document generation module 204 for the user 140 based on a particular time period (e.g., the past week, the past month, etc.). In this example, the document generation module 204 generates the text document 300 using words corresponding to the identities of merchants in transactions previously conducted by the user 140. In addition, the words in the text document 300 are arranged in a chronological order associated with the transactions (e.g., from old to new). As shown, the user 140 has purchased one or more items from 'Amazon' at the beginning of the particular time period, the user 140 then made a purchase from 'Best Buy', and then Whole Foods, and so forth. The user 140 also made a purchase from 'Burger_Express' at the end of the particular time period. Thus, the document generation module 204 generates text document 240 for the user 140 by inserting the words associated with the merchants in the previous transactions into the text document 240 based on a chronological order of the previous transactions. In this example, the text document 240 includes the names of the merchants in the previous transactions, including "Amazon; Best_Buy; Whole_Foods; Panera_Bread; Indian_Cuisine; Gambling_Fun; Ralphs; Pizza_Outlet; Best_Buy; Indian_Cuisine; Best_Buy; Frys_Electronics; Express_Clothing; Gambling_Fun; Burger_Express". As shown in FIG. 3, the text document 300 has words associated with different previous transactions that are separated by the document generation module 204 using a semicolon in this example.

In some embodiments, the document generation module 204 inserts the word(s) associated with each previous transaction into the text document 240 even though the words already appear in the text document 240. For example, since the user 140 has purchased from the merchant "Best_Buy" three times in the particular time period, the document generation module 204 inserts the word "Best_Buy" into the text document 240 three times.

While the text document 240 in this example is shown to include only the names of the merchants, in some embodiments, the document generation module 204 may insert word(s) associated with one or more different types of data of the previous transactions (e.g., amounts, products/services purchased, locations of the transactions, etc.) in addition to the names or instead of the names.

Once the text document 240 is generated, the risk manager 202 may use the topic model 206 to determine a topic classification for the user 140 based on the text document 240. In some embodiments, the topic model 206 comprises a natural language processor configured to parse a text document and to produce a topic classification based on the texts within the text document. In some embodiments, the topic model may be a latent topic model, such that the topic model is configured to classify documents into topic(s) without requiring the topic(s) to be defined (e.g., the topic(s) are not defined prior to training the topic model). For example, the latent topic model may be a latent semantic indexing model, a Latent Dirichlet Allocation (LDA) model, a Recurrent Neural Network (RNN), etc. Thus, the risk manager 202 may provide the text document 240 to the topic model 206 for determining a topic classification for the user 140.

Upon receiving the text document 240, the topic model 206 may analyze the words within the text document 240. In some embodiments, the topic model 206 may be configured to output a probability distribution over a set of topics based on the words included in risk document 206. To configure the topic model 206, the risk manager 202 may provide to the topic model 206 a number corresponding to a desirable number of topics that the topic model 206 can classify documents into (e.g., 5, 10, 20, 30, etc.). In some embodiments, the risk determination module 132 may provide a user interface on a device associated with the service provider server 130 to enable a person associated with the service provider server 130 to configure the topic model 206. For example, the user interface may enable the person to input a number corresponding to the number of topics for classifying risk documents. As discussed herein, the topic model 206 can be configured to classify text documents without requiring the topics to be pre-defined. Thus, the person is not required to provide any description or rules associated with the topics or algorithms in classifying documents into topics, but simply the number of topics for classification.

In addition to the number of topics, the risk manager 202 may also provide to the topic model 206 a corpus of text documents as training data. The corpus of text documents may include risk documents that the document generation module 204 generated for different users of the service provider server 130 based on words extracted from transactions previously conducted by the users over a period of time (e.g., past month, past year, etc.) and stored in the account database 136. In some embodiments, the risk manager 202 may use the document generation module 204 to generate the risk documents for the different users. These risk documents form the corpus of documents for training the topic model 206.

In some embodiments, the training for the topic model 206 is unsupervised. In other words, the risk documents from the corpus are not labeled with any pre-defined topics. Instead, the topic model 206, through parsing and analyzing the words in the risk documents of the corpus, derives the various topics and how different words in the documents contribute to the topics on its own. In some embodiments, the topic model 206 may assume that each of the documents in the corpus is characterized by a particular set of topics (corresponding to the desirable number of topics provided by the risk manager 202), and that each text (e.g., each word) in the documents contributes to at least one of the topics. Through parsing and analyzing the texts (the words) in the documents of the corpus, the topic model 206 may derive correlations between different words and different topics. In some embodiments, the order (or positions) in which the words appear in the document may affect how much the words contribute to the topics.

Once the topic model 206 is trained, the topic model may produce (e.g., output) a topic classification based on a text document. The topic classification may indicate one or more topic(s) derived from the text document or may include a probability distribution over multiple topics. Thus, when the risk manager provides the topic model 206 with the text document 240, the topic model 206 may analyze the words to produce a topic classification. For example, the topic model 206 may identify words that appear in the text document 240. The topic model 206 may determine how each of the words that appear in the text document 240 contributes to one or more of the topics based on a frequency (e.g., a count) of the word within the text document 240 and relative position(s) of the word with respect to other words in the text document 240. The topic model 206 may output a topic classification based on the analysis of the text document 240. The topic classification may include a selection of one or more topics from the different topics or a probability distribution over the different topics.

As discussed herein, the different topics that the topic model 206 classifies the text document 240 into may or may not be comprehensible by a human. In this example where the identities (e.g., names) of the merchants or sellers involved in the previous transactions are used to generate the text document 240, the topic model 260 may classify the text document into topics that may correspond to different types of merchants. However, the topics (e.g., the types of merchants) may not be ones that are recognizable by humans. It is because the topic model 206, through the unsupervised training, is configured to recognize patterns or topics that may not be apparent to humans but may nonetheless be critical in differentiating the documents (and the transactions associated with the users) from one another based on the words associated with the transactions and included in the documents. Thus, the topic model 206 may be configured to classify different text or risk documents to different topic classifications (e.g., different probability distributions across the different topics) based on the different words (corresponding to different merchants) included in the risk documents.

In one example, based on a parameter of 5 different topics provided to the topic model 206 during the training process, the topic model 206 may output a probability distribution 242 over 5 different unknown topics based on the words included in the text document 204. In some embodiments, the topic distribution 242 may include a vector having five probabilities, such as [0.2, 0.1, 0.4, 0.3, 0.0]. The vector indicates that the risk document 240 has a 20% chance of being associated with a first topic, a 10% chance of being associated with a second topic, a 40% chance of being associated with a third topic, a 30% chance of being associated with a fourth topic, and 0% chance of being associated with a fifth topic. It is noted that the topic classification output may vary based on the parameter (e.g., the number of topics) used to configure the topic model 206. For example, if the topic model 206 is configured to classify documents into 20 different topics, the topic classification output may include a vector of 20 probabilities.

The risk determination module 132 may use the topic classification to assess a risk associated with the user 140 and/or the transaction initiated by the user 140. In some embodiments, the risk determination module 132 may use the engine configuration module 208 to configure a risk assessment engine 212 for assessing the risk based on the topic classification. For example, the engine configuration module 208 may configure the risk assessment engine 212 to accept the topic classification (e.g., the probabilities associated with the different topics) as input values for determining a risk of the user 140.

In some embodiments, the risk assessment engine 212 may include a machine learning model (e.g., a neural network) that may be trained to produce a risk (e.g., a risk score, a risk category, etc.) based on the topic classification. The engine configuration module 208 may train the risk assessment engine 212 by using training data that includes topic classifications that the topic model 206 produces for different users of the service provider server 130. The topic classifications may be labeled with corresponding risk (e.g., corresponding risk categories, corresponding risk scores) determined by the risk determination module 132 or other modules of the service provider server 130 previously discussed. The risk assessment engine 212 may learn to determine risks for different users based on the topic classifications based on the training data.

Figure 4:
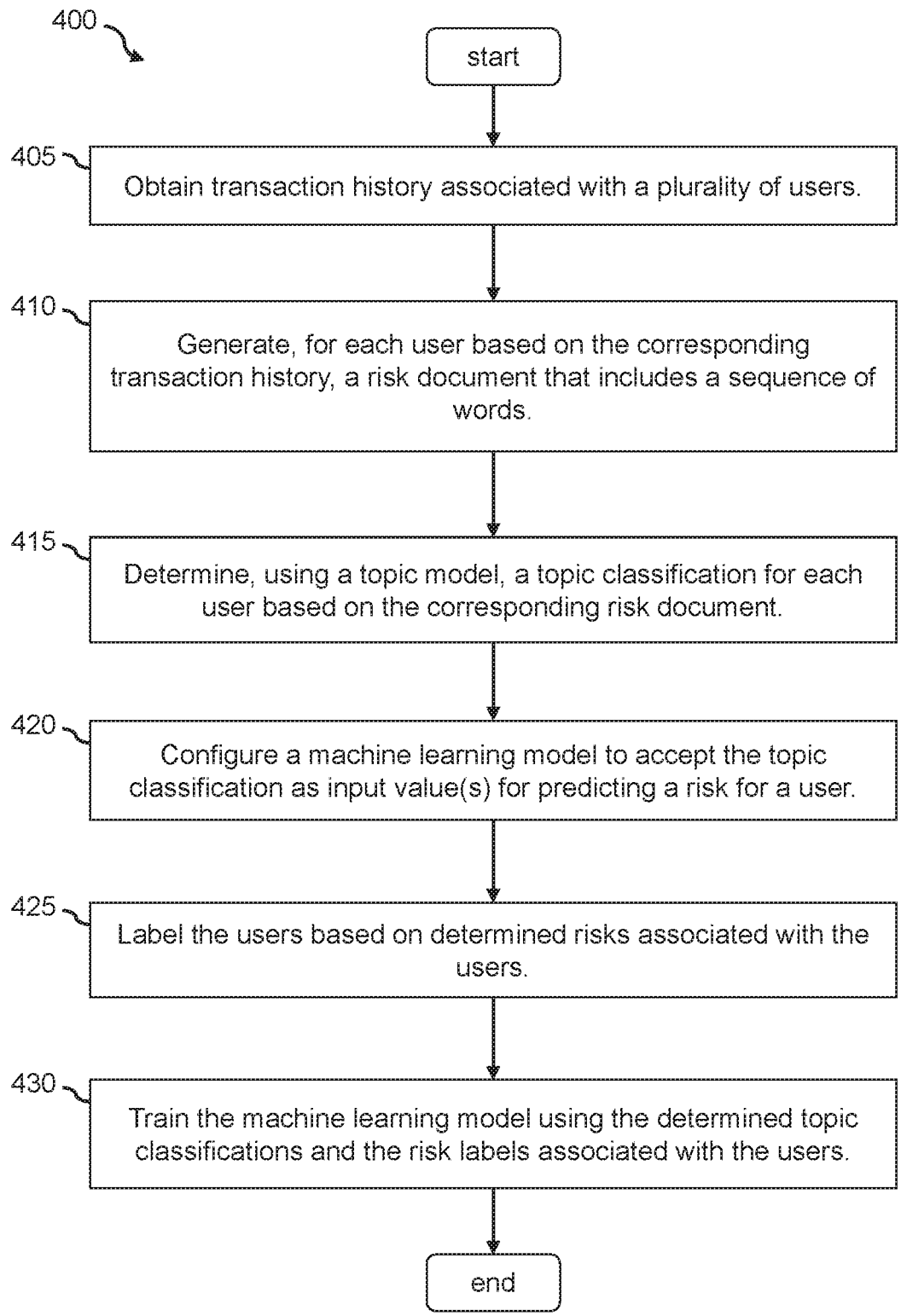
FIG. 4 is a flowchart showing a process of training a machine learning model for assessing a risk of a user according to an embodiment of the present disclosure.

FIG. 4 illustrates a process 400 for configuring and training the risk assessment engine 212 according to one embodiment of the disclosure. In some embodiments, part or all of the steps in the process 400 may be performed by the risk determination module 132 of the service provider server 130. The process 400 begins by obtaining (at step 405) transaction history associated with a plurality of users and generating (at step 410), for each user based on the corresponding transaction history, a risk document that includes a sequence of words. For example, the risk manager 202 may retrieve transaction data associated with transactions previously conducted by different users of the service provider server 130 within a time period (e.g., a year, 3 years, 5 years, etc.). The risk manager 202 may then use the document generation module 204 to generate a risk document for each of the users based on the transaction data using the techniques described herein. For example, the document generation module 204 may extract one or more words from the transaction data associated with each transaction previously conducted by a user and insert the word(s) into a text or risk document associated with the user. In some embodiments, the document generation module 204 may insert the words into the text document in a chronological order based on the timestamps of the transactions. Thus, the document generation module 204 may generate a text document for each of the user, where the text document includes words that describe each of the transactions previously conducted by the user.

The process 400 then determines (at step 415), using a topic model, a topic classification for each user based on the corresponding text document. For example, the risk manager 202 may use the topic model 206 to output a topic classification for each of the users based on the text document generated for the user. As discussed herein, the topic model 206 may parse and analyze the risk document. For example, the topic model 206 may identify and analyze the words included in the text document. The topic model 206 may determine a topic classification for the user based on the analyzing of the words in the text document.

The process 400 then configures (at step 420) a machine learning model to accept the topic classification as input value(s) for predicting a risk associated with the user. For example, the engine configuration module 208 may configure the risk assessment engine 212 to accept topic classifications as input value(s) for predicting a risk associated with a user. As discussed herein, the topic classification may include a probability distribution over the different topics, such as a vector having multiple probabilities. As such, the engine configuration module 208 may configure the risk assessment engine 212 to accept the probabilities in the vector as input values. If the risk assessment engine 212 is a neural network, the engine configuration module 208 may configure the risk assessment engine 212 to include at least the number of input nodes (in the input layer) as the number of topics available to the topic model 206 (which corresponds to the number of probabilities included in the topic classification output).

The process 400 labels (at step 425) the users based on determined risks associated with the users and trains (at step 430) the machine learning model using the determined topic classifications and the risk labels associated with the uses. For example, risk manager 202 may label each of the users for whom the document generation module 204 has generated text documents based on risks associated with the users. In some embodiments, the risk manager 202 may label the users based on the transaction history associated with the user, for example, a transaction decline rate, a default rate when the user was offered a credit, a credit score associated with the user, etc. The labels assigned to the users may correspond to the desired output of the risk assessment engine 212. For example, if the risk assessment engine 212 is configured to produce a risk score (e.g., a percentage between 0% and 100%), the labels assigned to the users may include risk scores associated with the user.

The engine configuration module 208 may train the risk assessment engine 212 using the topic classifications determined for the users and the labels assigned to the users. Through the training process, the risk assessment engine 212 may learn the correlations between topic classifications and risks in order to predict a risk for a user based on a topic classification.

Figure 5:
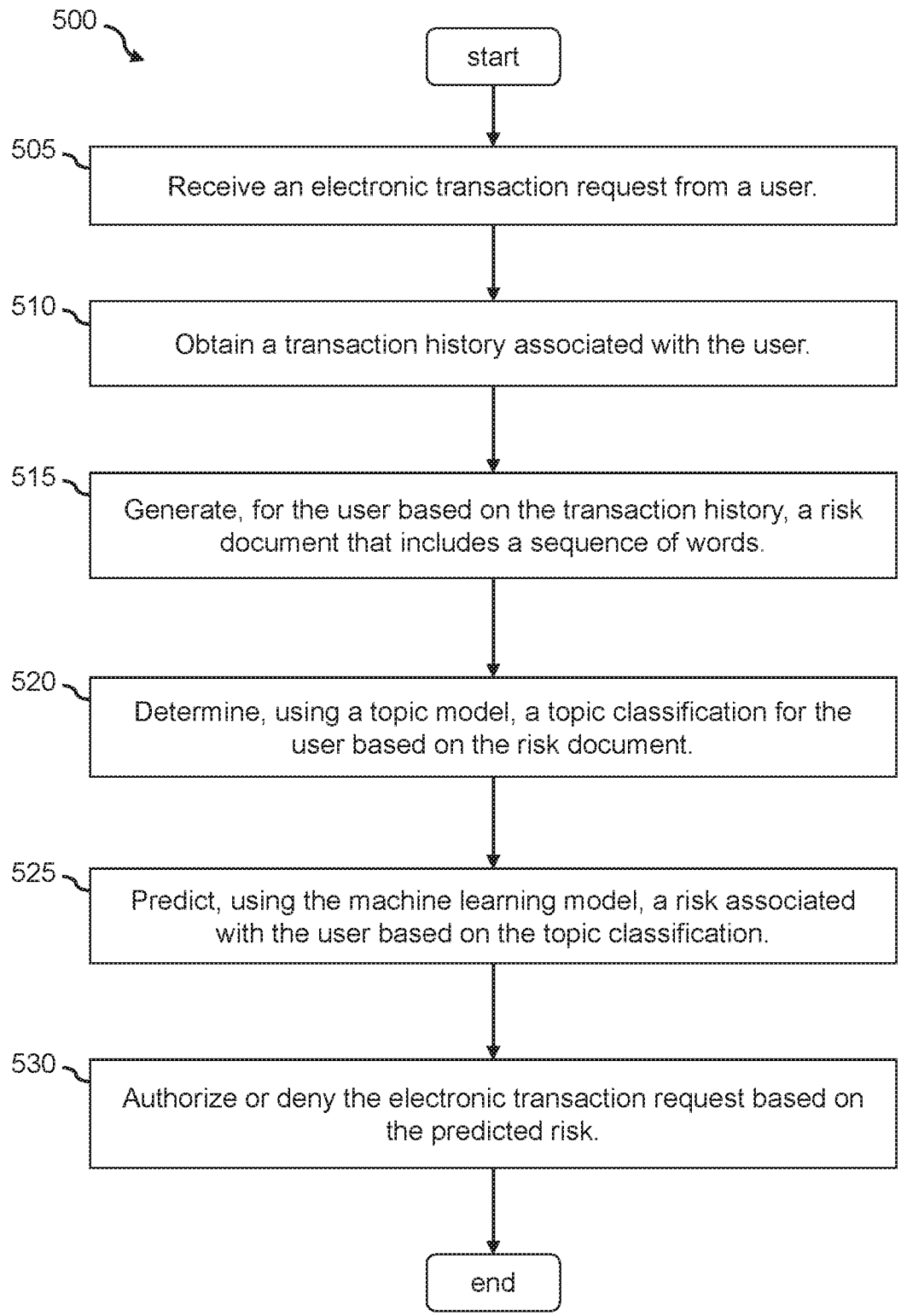
FIG. 5 is a flowchart showing a process of determining a risk of a user according to an embodiment of the present disclosure.

Once the risk assessment engine 212 is trained, the risk manager 202 may begin using the risk assessment engine 212 to predict a risk associated with a user or a transaction initiated by the user based on a text or risk document generated for the user. FIG. 5 illustrates a process 500 for determining a risk for a user and/or a transaction according to some embodiments of the disclosure. In some embodiments, some or all of the steps in the process 500 may be performed by the risk determination module 132. The process 500 begins by receiving (at step 505) an electronic transaction request from a user. For example, the interface server 134 may receive a transaction request from the user 140 for performing a payment transaction associated with a purchase from the merchant of the merchant server 120.

The process 500 then obtains (at step 510) a transaction history associated with the user. For example, the risk manager 202 may retrieve data associated with transactions conducted by the user 140 within a particular time period (e.g., the past week, the past month, the past year, etc.) from the accounts database 136. In some embodiments, the risk manager 202 may determine the time period for obtaining transaction data associated with the user 140. For example, the risk manager 202 may determine a length of the time period (e.g., a week, a month, a year, etc.) based on the type of transaction associated with the transaction request. In one example, the risk manager 202 may determine a longer time period when the risk associated with the transaction is high (e.g., a higher amount, the type of products/services being purchased is associated with high risk, etc.), and may determine a shorter time period when the risk associated with the transaction is low (e.g., a lower amount, type of products/services being purchased is associated with low risk, etc.).

The process 500 then generates (at step 515), for the user based on the transaction history, a text or risk document that includes a sequence of words. For example, the risk manager 202 may use the document generation module 204 to generate the text document 240 for the user 140 based on the transaction data retrieved from the accounts database 136 using the techniques described herein. The text document 240 may include words associated with the names of the merchants in the transactions or other words that describe the transactions.

After generating the risk document, the process 500 determines (at step 520), using a topic model, a topic classification for the user based on the text document. For example, the risk manager 202 may use the topic model 206 to produce a topic classification 242 for the user 140 based on the text document 240. The topic model 206 may identify and analyze the words included in the risk document 240 and output the topic classification 242 based on the text document 240. The topic classification may include a probability distribution over a set of unknown topics, such as [0.2, 0.1, 0.4, 0.3, 0.0].

The process 500 then predicts (at step 525), using a machine learning model, a risk associated with the user based on the topic classification. For example, the risk manager 202 may provide the topic classification (e.g., the probability distribution over the set of topics, such as [0.2, 0.1, 0.4, 0.3, 0.0]) as input values to the risk assessment engine 212. The risk assessment engine 212 of some embodiments is configured to produce a risk (e.g., a risk score) for the user 140 based on the topic classification 242. As such, the risk assessment engine 212 may predict a risk associated with the user 140 based on the user 140's transaction history within the particular time period.

However, the user 140's transaction habit may change over time and the user 140's more recent transactions may be more indicative to how the user 140 behaves than the older transactions. Thus, in some embodiments, the risk manager 202 may take into account the timing of different transactions associated with the user 140 by generating multiple risk documents associated with different time periods, where at least one text or risk document is associated with a time period that is either more recent or shorter than another text or risk document. For example, the risk manager 202 may use the document generation module 204 to generate different text documents associated with time period lengths. The risk manager 202 may use the document generation module 204 to generate a first text document based on transactions conducted by the user 140 over a first time period (e.g., the past year). The risk manager 202 may then use the document generation module 204 to generate a second text document based on transactions conducted by the user 140 over a second time period (e.g., the past month).

The risk manager 202 may then use the document generation module 204 to generate a third text document based on transactions conducted by the user 140 over a third time period (e.g., the past week).

In another example, the risk manager 202 may use the document generation module 204 to generate text or risk documents associated with different periods of time. The risk manager 202 may use the document generation module 204 to generate a first text document based on transactions conducted by the user 140 over a first time period (e.g., January to March). The risk manager 202 may then use the document generation module 204 to generate a second text document based on transactions conducted by the user 140 over a second time period (e.g., April to June). The risk manager 202 may then use the document generation module 204 to generate a third text document based on transactions conducted by the user 140 over a third time period (e.g., July to September). While in the examples described above the risk manager 202 generates three different text documents for the user 140, it is conceivable that the risk manager 202 may generate different number of text documents (e.g., 2, 5, 10) for covering different time periods. The risk manager 202 may then use the topic model 206 to produce a topic classification for each of the generated text documents. In the example described above, the topic model 206 may produce three different topic classifications for the three text documents.

In some embodiments, the engine configuration module 208 may configure the risk assessment engine 212 to accept multiple (e.g., 3, 5, etc.) topic classifications as input values (instead of a single topic classification) for predicting a risk for the user. Thus, the risk manager 202 may provide the different topic classifications determined for the user 140 based on different time periods to the risk assessment engine 212 as input values. The risk assessment engine 212 may predict a risk (e.g., a risk score) for the user based on the topic classifications. The advantage of predicting the risk for the user 140 using multiple topic classifications is that it takes into account the different timing of the transactions conducted by the user 140.

Referring back to FIG. 5, the process 500 then authorizes or denies (at step 530) the transaction request based on the predicted risk. For example, the risk manager 202 may provide the risk determined for the user 140 to other modules of the online service provider 130, such as the interface server 134. The interface server 134 may determine to process the transaction request based on the risk determined for the user 140 by the risk determination module 132. For example, the interface server 134 may authorize the transaction request if the risk is below a threshold (e.g., 30%, 40%, 50%, etc.) and may deny the transaction request if the risk is above a threshold (e.g., 50%, 70%, 80%, etc.). Furthermore, the interface server 134 may determine to offer a credit (and an amount associated with the credit) based on the risk determined by the risk determination module 132. For example, the transaction request may be associated with a purchase of a product or service from a merchant. The service provider server 130 may determine to offer a credit (associated with an amount, such as 80% of the price of the product or service, etc.) to the user 140 for the transaction based on the risk determined for the user 140 by the risk determination module 132.

While the examples described above illustrate the use of the topic classifications and machine learning models for predicting a risk associated with a transaction, it is conceivable that the same techniques can be used for other purposes, such as detecting whether a user account has been fraudulently taken over. For example, the document generation module 204 may generate a text document to include words that describe computing environments in which a user logs on to an account with the service provider server 130 in previous log in transactions (e.g., a physical location of a user device, a browser name, an operating system name, etc.). The topic model 206 may determine a topic classification by identifying and analyzing words within the text document. The risk assessment engine 212 may be trained to predict an account take over (ATO) risk based on the topic classification.

Figure 6:
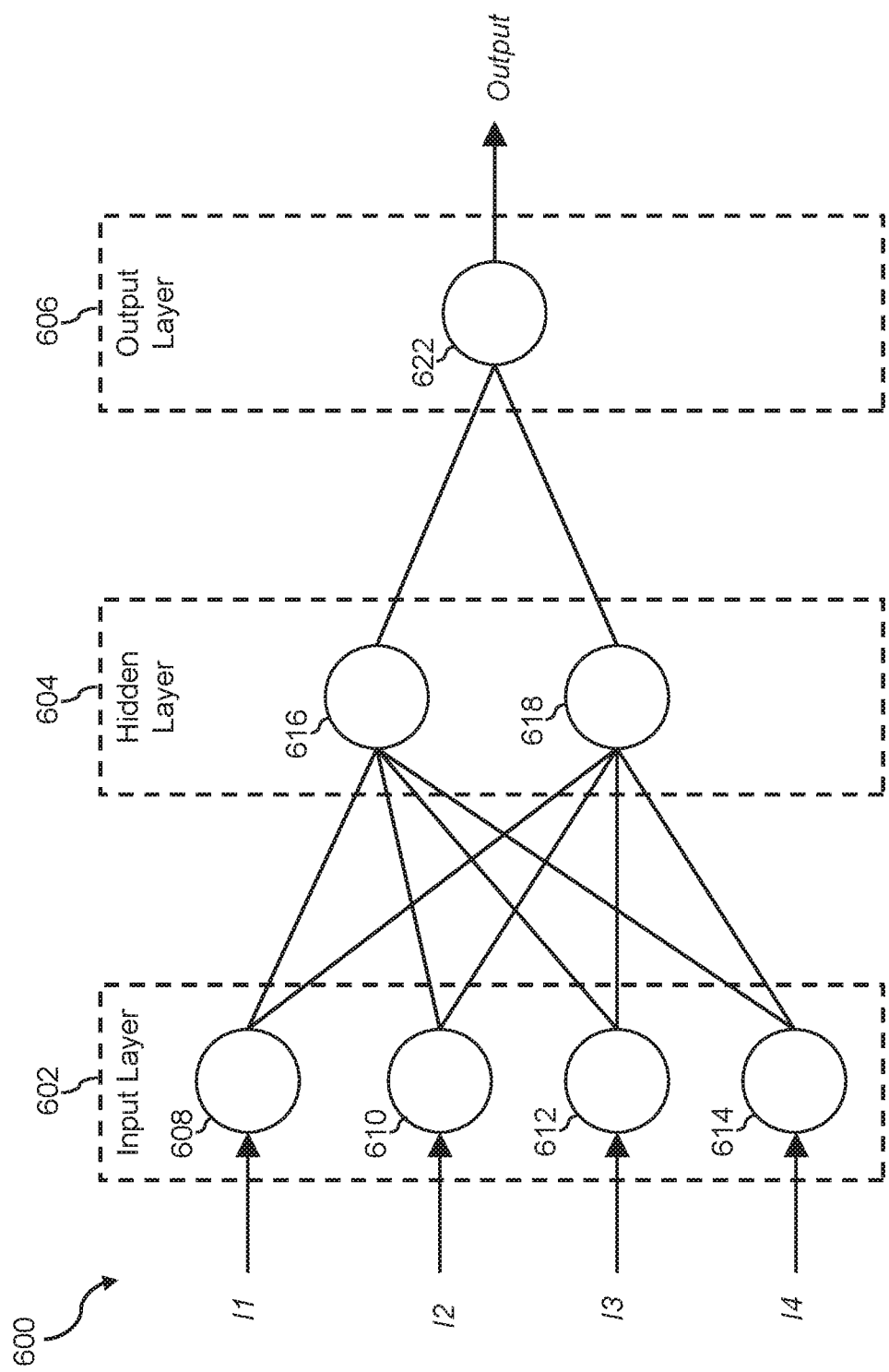
FIG. 6 illustrates another exemplary artificial neural network according to an embodiment of the present disclosure.

FIG. 6 illustrates an example artificial neural network 600 that may be used to implement the risk assessment engine 212. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the risk assessment engine 212 may include as many hidden layers as necessary.

In this example, the artificial neural network 600 receives a set of input values and produces an output value (e.g., a risk). Each node in the input layer 602 may correspond to a distinct input value. For example, when the artificial neural network 600 is used to implement the risk assessment engine 212, each node in the input layer 602 may correspond to a distinct topic from the different topics available to the topic model 206. In a non-limiting example, the node 608 may correspond to a first topic, the node 610 may correspond to a second topic, the node 612 may correspond to a third topic, the node 614 may correspond to a fourth topic, and so forth.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the risk assessment engine 212, the output value produced by the artificial neural network 600 may indicate a likelihood that a profile is connected to an entity (e.g., a malicious user).

The artificial neural network 600 may be trained by using training data. By providing training data to the artificial neural network 600, the nodes 616-618 in the hidden layer 604 may be trained (adjusted) such that an optimal output (e.g., a classification) is produced in the output layer 606 based on the training data. By continuously providing different sets of training data, and penalizing the artificial neural network 500 when the output of the artificial neural network 600 is incorrect (e.g., when the determined (predicted) risk is inconsistent with risk label associated with the training data set, etc.), the artificial neural network 600 (and specifically, the representations of the nodes in the hidden layer 564) may be trained (adjusted) to improve its performance in data classification. Adjusting the artificial neural network 600 may include adjusting the weights associated with each node in the hidden layer 604.

Figure 7:
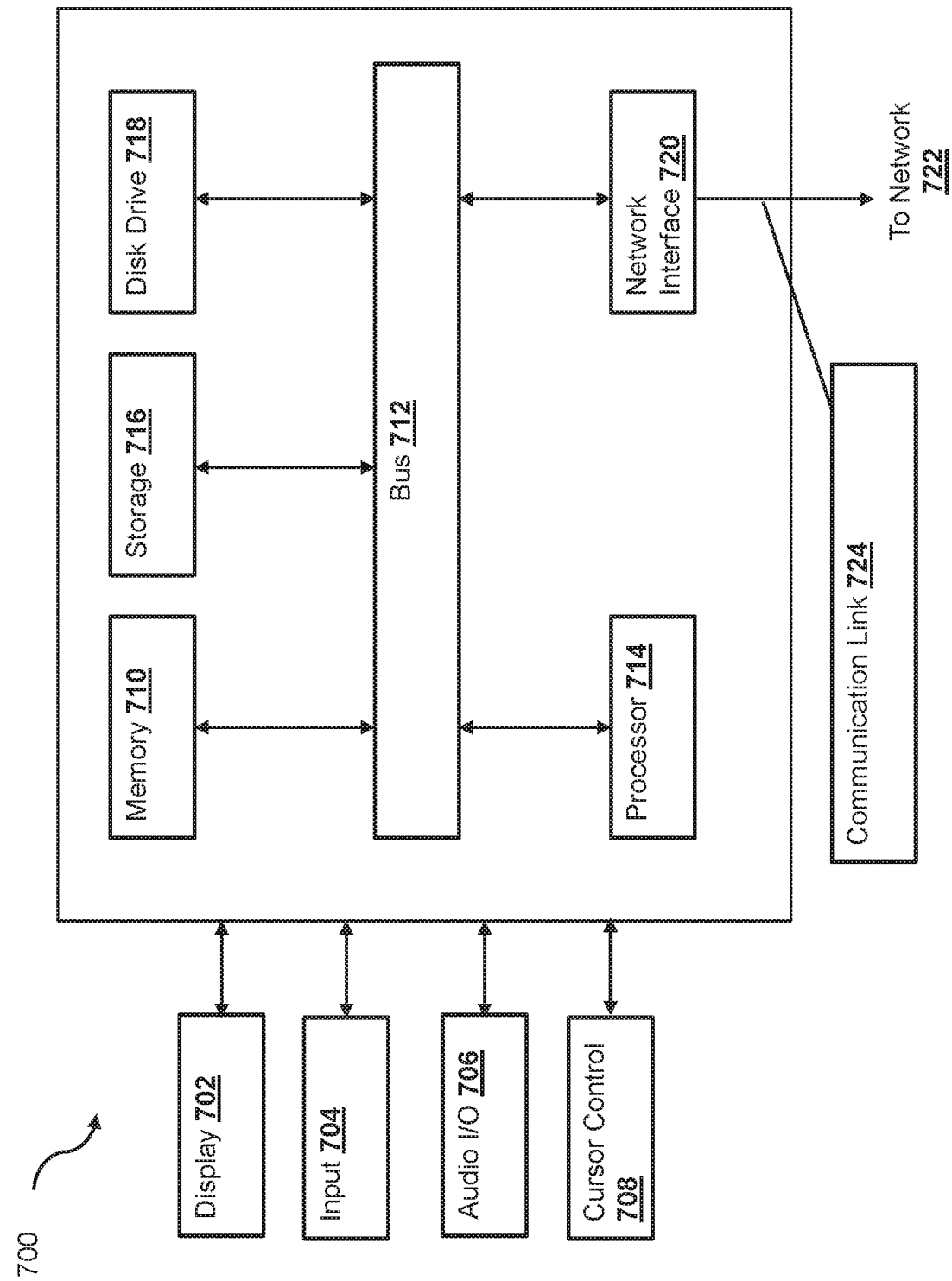
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the risk determination functionalities described herein according to the processes 400 and 500.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a user via a device, a payment transaction request associated with a transaction between the user and a merchant;
determining, based on a timing of different transactions conducted by the user, a first time period and a second time period for evaluating a risk of the payment transaction request, wherein the first time period is different from the second time period;
obtaining a first transaction history associated with the user, wherein the first transaction history represents a first plurality of transactions conducted by the user over the first time period;
obtaining a second transaction history associated with the user, wherein the second transaction history represents a second plurality of transactions conducted by the user over the second time period;
generating a first sequence of words based on the first transaction history, wherein the first sequence of words represents information associated with the first plurality of transactions, wherein the first sequence of words comprises first subsets of words that describe the first plurality of transactions in a chronological order, and wherein each subset of words in the first subsets of words describes a distinct transaction in the first plurality of transactions;
generating a second sequence of words based on the second transaction history, wherein the second sequence of words represents information associated with the second plurality of transactions, wherein the second sequence of words comprises second subsets of words that describe the second plurality of transactions in a chronological order, and wherein each subset of words in the second subsets of words describes a distinct transaction in the second plurality of transactions;
determining, for the user and using an unsupervised latent topic generator, a first topic classification based at least in part on the first sequence of words and a second topic classification based at least in part on the second sequence of words;
configuring a machine learning model to accept at least the first and second topic classifications as input values, the machine learning model being trained using topic classifications determined for a plurality of users and risk labels associated with the plurality of users;
predicting a risk associated with the user using the machine learning model based on the first and second topic classifications determined for the user; and
authorizing or denying the payment transaction request based on the predicted risk.

2. The system of claim 1, wherein the first sequence of words describes sellers associated with the first plurality of transactions.

3. The system of claim 1, wherein the first sequence of words describes purchased items and prices associated with the first plurality of transactions.

4. The system of claim 1, wherein the unsupervised latent topic generator comprises a Latent Dirichlet Allocation (LDA) algorithm configured to analyze individual words within the first sequence of words, and wherein the operations further comprise determining a probability distribution over a plurality of undefined topics using the LDA algorithm.

5. The system of claim 1, wherein the operations further comprise:
    obtaining a third transaction history associated with a second user, wherein the third transaction history represents a third plurality of transactions conducted by the second user over a third time period and a fourth plurality of transactions conducted by the second user over a fourth time period;
    generating a third sequence of words based on the third plurality of transactions;
    generating a fourth sequence of words based on the fourth plurality of transaction;
    determining, using the unsupervised latent topic generator for the second user, a third topic classification based at least in part on the third sequence of words and a fourth topic classification based at least in part on the fourth sequence of words; and
    predicting a credit risk for the second user using the machine learning model based on the third and fourth topic classifications.

6. The system of claim 5, wherein the operations further comprise:
    authorizing or denying an electronic transaction associated with the second user based on the predicted credit risk.

7. The system of claim 1, wherein the first topic classification comprises a plurality of values corresponding to a plurality of topics, wherein each value in the plurality of values represents a probability that the user is associated with the corresponding topic in the plurality of topics.

8. The system of claim 7, wherein all of the topics in the plurality of topics are undefined.

9. A method, comprising:
    receiving, from a user via a user device, a payment transaction request associated with a transaction between the user and a merchant;
    determining a first time period and a second time period for assessing a risk of the user based on a timing of different transactions conducted by the user, wherein the first time period is different from the second time period;
    obtaining a first transaction history associated with the user, wherein the first transaction history comprises a first plurality of transactions conducted by the user over the first time period;
    obtaining a second transaction history associated with the user, wherein the second transaction history comprises and a second plurality of transactions conducted by the user over the second time period;
    generating a first sequence of words based on the first transaction history, wherein the first sequence of words represents information associated with the first plurality of transactions, wherein the first sequence of words comprises first subsets of words that describe the first plurality of transactions in a chronological order, and wherein each subset of words in the first subsets of words describes a distinct transaction in the first plurality of transactions;
    generating a second sequence of words based on the second transaction history, wherein the second sequence of words represents information associated with the second plurality of transactions, wherein the second sequence of words comprises second subsets of words that describe the second plurality of transactions in a chronological order, and wherein each subset of words in the second subsets of words describes a distinct transaction in the second plurality of transactions;
    determining, using an unsupervised latent topic generator, a first topic classification based at least in part on the first sequence of words and a second topic classification based at least in part on the second sequence of words;
    configuring a machine learning model to accept at least the first and second topic classifications as input values, the machine learning model being trained using topic classifications determined for a plurality of users and risk labels associated with the plurality of users;
    predicting a risk for the user using the machine learning model based on the first and second topic classifications determined for the user; and
    authorizing or denying the payment transaction request based on the predicted risk.

10. The method of claim 9, further comprising configuring the unsupervised latent topic model generator based on a parameter representing a number corresponding to a number of topics.

11. The method of claim 9, wherein the first time period is a different length than the second time period.

12. The method of claim 9, wherein the second time period is a portion of the first time period.

13. The method of claim 9, wherein the second time period is after the first time period.

14. The method of claim 9, wherein the first sequence of words describes entities involved in the first plurality of transactions.

15. The method of claim 9, wherein the operations further comprise determining an amount of credit extended to the user for a transaction associated with the payment transaction request.

16. A non-transitory machine-readable medium having stored thereon machine-readable instructions that, when executed by one or more hardware processors, perform operations comprising:
    receiving, from a user via a device, a payment transaction request associated with a transaction between the user and a merchant;
    determining, based on a timing of different transactions conducted by the user, a first time period and a second time period for evaluating a risk of the payment transaction request, wherein the first time period is different from the second time period;
    obtaining a first transaction history associated with the user, wherein the first transaction history represents a first plurality of transactions conducted by the user over the first period of time;
    obtaining a second transaction history associated with the user, wherein the second transaction history represents a second plurality of transactions conducted by the user over the second period of time;
    generating a first sequence of words based on the first transaction history, wherein the first sequence of words represents information associated with the first plurality of transactions, wherein the first sequence of words comprises first subsets of words that describe the first plurality of transactions in a chronological order, and wherein each subset of words in the first subsets of words describes a distinct transaction in the first plurality of transactions;

generating a second sequence of words based on the second transaction history, wherein the second sequence of words represents information associated with the second plurality of transactions, wherein the second sequence of words comprises second subsets of words that describe the second plurality of transactions in a chronological order, and wherein each subset of words in the second subsets of words describes a distinct transaction in the second plurality of transactions;

determining, using an unsupervised latent topic generator for the user, a first topic classification based at least in part on the first sequence of words and a second topic classification based at least in part on the second sequence of words;

configuring a machine learning model to accept at least the first and second topic classifications as input values, the machine learning model being trained using topic classifications determined for a plurality of users and risk labels associated with the plurality of users;

predicting a risk associated with the user using the machine learning model based on the first and second topic classifications determined for the user; and authorizing or denying the payment transaction request based on the predicted risk.

17. The non-transitory machine-readable medium of claim 16, wherein the first topic classification comprises a probability distribution over a plurality of undefined topics, and wherein the machine learning model is configured to accept probability values included in the probability distribution as input values.

18. The non-transitory machine-readable medium of claim 17, wherein the operations further comprise configuring the unsupervised latent topic generator based on a parameter representing a number corresponding to a number of topics in the plurality of undefined topics.

19. The non-transitory machine-readable medium of claim 16, wherein the first sequence of words describes sellers associated with the first plurality of transactions.

20. The non-transitory machine-readable medium of claim 16, wherein the first sequence of words describes purchased items and prices associated with the first plurality of transactions.

* * * * *

UNITED STATES PATENT AND TRADEMARK OFFICE
CERTIFICATE OF CORRECTION

| | |
|---|---|
| PATENT NO. | : 11,501,302 B2 |
| APPLICATION NO. | : 16/849343 |
| DATED | : November 15, 2022 |
| INVENTOR(S) | : Tomer Handelman |

It is certified that error appears in the above-identified patent and that said Letters Patent is hereby corrected as shown below:

In the Claims

In Claim 9, Column 21, Line 53 change "and a second plurality of transactions conducted by the" to --a second plurality of transactions conducted by the"--

In Claim 10, Column 22, Lines 22-23 change "The method of claim 9, further comprising configuring the unsupervised latent topic model generator based on" to --The method of claim 9, further comprising configuring the unsupervised latent topic generator based on--

Signed and Sealed this
Tenth Day of January, 2023

Katherine Kelly Vidal
*Director of the United States Patent and Trademark Office*